United States Patent
Kitazaki et al.

(10) Patent No.: US 7,672,772 B2
(45) Date of Patent: Mar. 2, 2010

(54) APPARATUS AND METHOD FOR EVALUATING A DEGREE OF A SAFETY IN TRAVELING OF A VEHICLE

(75) Inventors: Tsuyoshi Kitazaki, Kanagawa (JP); Jun Matsuda, Kanagawa (JP); Naoshi Miyashita, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 11/827,540

(22) Filed: Jul. 11, 2007

(65) Prior Publication Data

US 2008/0015763 A1    Jan. 17, 2008

(30) Foreign Application Priority Data

Jul. 11, 2006    (JP)    ............................. 2006-190414

(51) Int. Cl.
    *B60C 23/04*    (2006.01)
(52) U.S. Cl. .......................................... 701/82; 702/33
(58) Field of Classification Search ............... 701/29, 701/80, 82; 303/150, 194; 73/1.82, 7–9, 73/11.05, 12.04, 54.23, 54.24, 657, 146; 702/33, 41, 42, 56, 76, 79, 94, 96, 111
See application file for complete search history.

(56) References Cited

U.S. PATENT DOCUMENTS

| 2005/0085987 A1 | 4/2005 | Yokota et al. |
| 2007/0205879 A1 | 9/2007 | Matsuda et al. |

FOREIGN PATENT DOCUMENTS

| JP | 05-332889 | 12/1993 |
| JP | 2002-340863 | 11/2002 |
| JP | 2003-182476 | 7/2003 |
| JP | 2005-205956 | 8/2005 |
| WO | WO 2006/054744 A1 | 5/2006 |

OTHER PUBLICATIONS

Office Action dated Oct. 2, 2007 from corresponding Japanese Patent Application No. 2007-177126.

*Primary Examiner*—Dalena Tran
(74) *Attorney, Agent, or Firm*—Knobbe Martens Olson & Bear, LLP

(57) ABSTRACT

The apparatus acquires acceleration data in time series at a fixed position of a tire while a vehicle having the tire is traveling on a road surface, obtains a spectrum of the acceleration by subjecting the acquired time series acceleration data to frequency analysis, and detects a peak value of the spectrum of the acceleration in a frequency range of 500 Hz-1500 Hz. The apparatus evaluates a degree of a safety in traveling of the vehicle according to the detected peak value. The acceleration data is acquired by an acceleration sensor mounted on the fixed position of the tire.

19 Claims, 9 Drawing Sheets

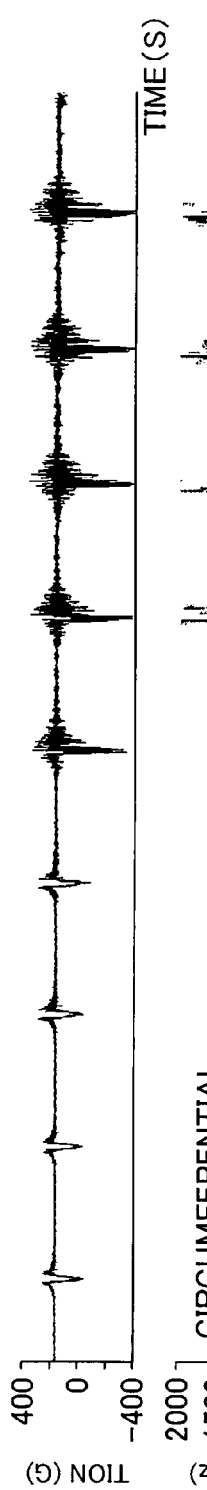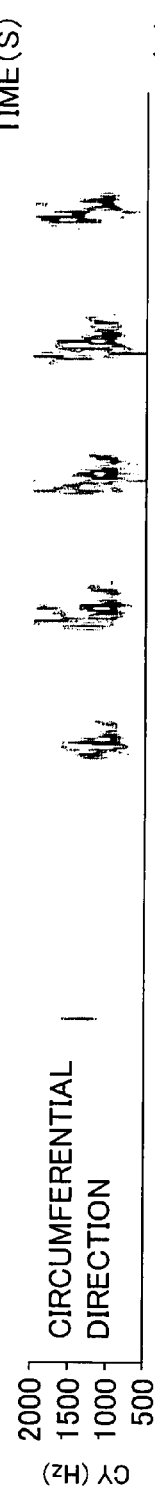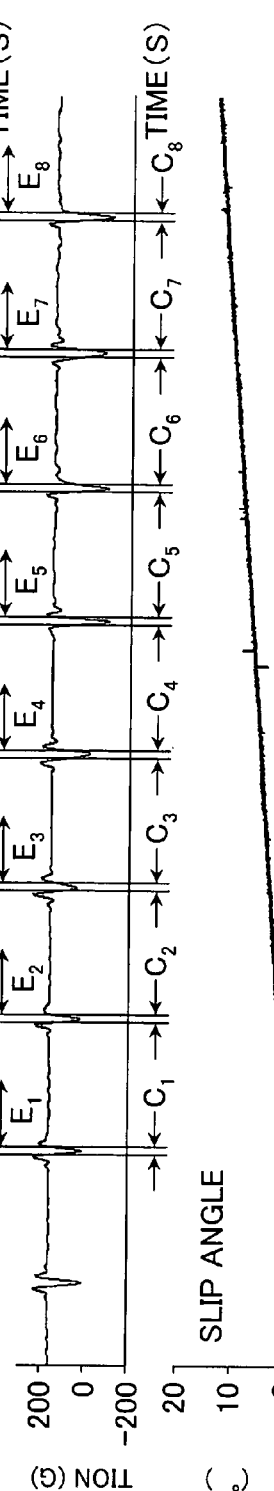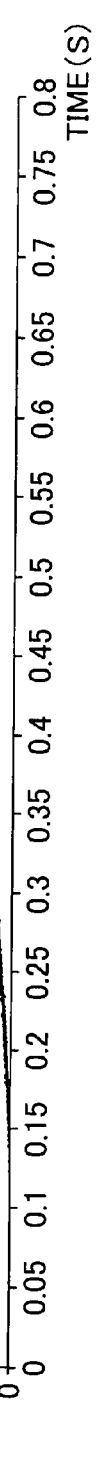

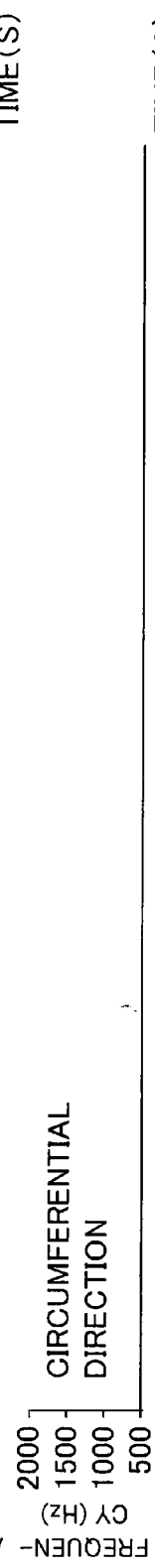
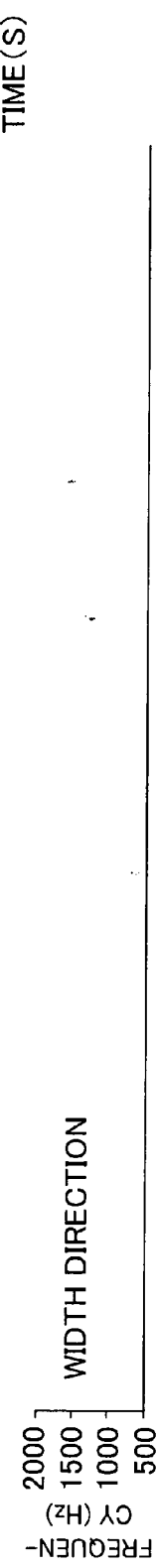
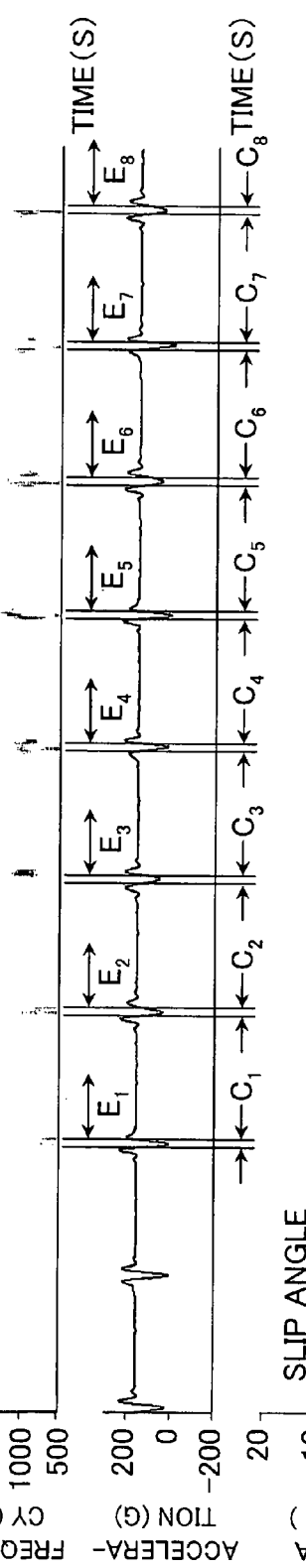
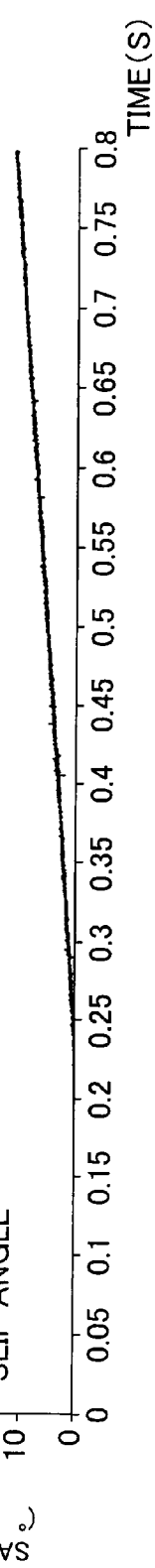

APPARATUS AND METHOD FOR EVALUATING A DEGREE OF A SAFETY IN TRAVELING OF A VEHICLE

CROSS REFERENCE TO RELATED APPLICATION

This application is a continuation of and claims the benefit and priority to Japanese Application Number 2006-190414 filed on Jul. 11, 2006. The disclosure of the above-described application is hereby incorporated by reference in its entirety.

BACKGROUND OF THE INVENTION

The present invention generally relates to a method and apparatus for evaluating a degree of a safety in traveling of a vehicle.

It is important for a driver to know the traveling condition of a motor vehicle that he is driving. It is particularly important for the driver to know a degree of a safety in traveling (i.e., traveling safety) of the motor vehicle. In this description, "traveling safety" is used to represent a degree of driving easiness and/or driving safety of a vehicle. A degree of traveling safety of a vehicle corresponds to a degree of slipping between a tire of the vehicle and a road surface on which the vehicle is traveling. In general, the larger the degree of slipping between the tire of the vehicle and the road surface, the lower the degree of driving easiness and/or driving safety of the vehicle in driving, and the higher the difficulty in driving the vehicle. Therefore, the larger the degree of slipping between the tire of the vehicle and the road surface, the lower the traveling safety of the vehicle. Conventionally, as an attempt for enabling a driver to know the degree of traveling safety of a vehicle that the driver is driving, various methods and apparatuses have been proposed.

For example, if a certain amount of cornering force and lateral force is applied to a vehicle during traveling, slipping occurs in a contact region between a tire and a road surface. If the degree of slipping increases to a relatively high level, driving (controlling) of the vehicle to which the tire is mounted becomes difficult. Therefore, the degree of slipping significantly relates to the traveling safety of the vehicle. JP 5-332889 A discloses an apparatus that measures a tire squeal sound by a microphone provided in the vicinity of a tire of a vehicle, estimates the contact condition of the tire against the road surface, based on the measured squeal sound, and generates an alarm to the driver according to the estimated contact condition. In this description, "squeal sound" means a sound having a frequency in the range of about 500 Hz to 1500 Hz, generated from a tire vibrating due to slippage between the tire and the road surface, as described in JP 5-332889 A. The squeal sound is generated due to tire vibration which occurs depending on the condition of contact between the tire and the road surface.

JP 2002-340863 A and JP 2003-182476 A, each propose a method and apparatus for evaluating the traveling condition of a tire based on the tire vibration that occurs depending on the contact condition of the tire and the road surface. JP 2002-340863 A discloses, as described in Paragraph 0014 of JP 2002-340863 A, a method and apparatus for determining a road surface condition, uses, as a reference, a frequency spectrum of acceleration data and a frequency spectrum of sound pressure that are obtained inside a tire when the vehicle is traveling at a constant speed on a dry road, so that a road condition is determined by detecting deviation from the reference frequency spectrum in a specific frequency during traveling. JP 2002-340863 A uses a frequency spectrum of an acceleration signal generated on a tire in the fore-and-aft direction of the vehicle to evaluate a road surface condition. JP 2003-182476 A discloses an apparatus for estimating a road surface condition and tire traveling condition aiming for improving the traveling safety of a vehicle. In the method proposed in JP 2003-182476 A, as described in Paragraph 0004 of JP 2003-182476 A, the condition of the road surface with which the tire is made in contact is accurately estimated under a constant traveling condition without any special action such as braking or steering. As described in Paragraph 0005 of JP 2003-182476 A, the method described in JP 2003-182476 A has been invented by noting the fact that the vibration level in a frequency spectrum of vibrations obtained by subjecting the vibrations in the circumferential direction or in the width direction of the tire during traveling to frequency analysis characteristically changes depending on the condition of a road surface with which the tire is made in contact, or the fault status of the tire. The invention described in JP 2003-182476A, acquires information of vibrations of a wheel or suspension as the information that represent vibrations of the tire. The acquired vibrations are subjected to frequency analysis to obtain a frequency spectrum. Based on the vibration level in a specific frequency range of the obtained frequency spectrum, the road surface condition during traveling (mainly, coefficient of friction between road surface and tire) and the traveling condition (e.g., inflation pressure, wearing status, fault status) of the tire are estimated.

SUMMARY OF THE INVENTION

However, in the method and apparatus for estimating a tire contact condition described in JP 5-332889 A, a microphone provided in the vicinity of a tire of the vehicle is used to directly measure the squeal sound generated on the tire. However, there have been problems in which, if the microphone is mounted in the vicinity of the tire, as described above, the result of measurement may be affected by external sound such as engine sound, or hissing sound, thus preventing the tire contact condition from being accurately estimated.

The apparatus for determining a road surface condition described in JP 2002-340863 A, and the method for estimating a load surface condition and tire traveling condition described in JP 2003-182476 A, both aim to determine a condition of road surface. The apparatus for determining a road surface condition described in JP 2002-340863 A in which a frequency spectrum of an acceleration signal generated on the tire in the fore-and-aft direction of the vehicle is used to evaluate the condition of the road surface, allows the driver of the motor vehicle to know the degree of tendency of slipping of the road surface on which his vehicle is traveling. However, the driver is not allowed to know either the degree of slipping in the contact region between the tire and the road surface, which varies with time during driving, or the traveling safety of the vehicle in conjunction with the amount of slipping. Even in the method described in JP 2003-182476 A in which a road condition and tire traveling condition are estimated based on the vibration level in a frequency spectrum of vibrations obtained by subjecting the vibrations in the circumferential direction or in the width direction of the tire during traveling to frequency analysis, the driver is not allowed to know either the degree of slipping in the contact region between the tire and the road surface, which varies with time during driving, or the traveling safety of the vehicle in conjunction with the amount of slipping.

The present invention has been made in order to solve the problems described above and an object of the present invention is to accurately evaluate a traveling safety of a vehicle.

In order to solve the above-mentioned problems, the present invention provides an apparatus for evaluating a degree of a safety in traveling of a vehicle provided with wheels each having a tire mounted thereon, while the vehicle is traveling on a road surface, the apparatus comprising: acceleration data acquiring means for acquiring acceleration data in time series at a fixed position of the tire, the acceleration being generated by an external force applied from the road surface to the tire which is rotating, while the vehicle is traveling on the road surface; spectrum obtaining means for obtaining a spectrum of the acceleration by subjecting the acquired time series acceleration data to frequency analysis; peak value detecting means for detecting a peak value of the spectrum of the acceleration in a frequency range of 500 Hz-1500 Hz; and traveling safety evaluating means for evaluating a degree of a safety in traveling of the vehicle according to the detected peak value.

Preferably, the acceleration data acquiring means includes acceleration data in a radial direction of the tire.

Preferably, the acceleration data at a fixed position of the tire is measured by an acceleration sensor mounted on a fixed position of the tire, the acceleration being generated by the external force applied from the road surface to the tire which is rotating, while the vehicle is traveling on the road surface, the acceleration sensor measuring and outputting acceleration at the fixed position.

Preferably, the spectrum obtaining means comprises: extracting a time region for analysis of the spectrum, out of a measurement time of the time series acceleration data, the time region for the analysis of the spectrum starting after the fixed position passes a portion corresponding to a contact region between the tire and the road surface and ending when the fixed position reaches a position opposite to a center of the contact region with respect to a tire axis, and determining, as the spectrum of the acceleration, a spectrum of the time series acceleration data in the time region for the analysis of the spectrum. And preferably, the spectrum obtaining means extracts the time region for the analysis of the spectrum, based on the acquired time series acceleration data.

Preferably, the evaluating means evaluates a degree of a safety in traveling of the vehicle according to a maximum value of the peak value of the spectrum of the time series acceleration data within the time region for the analysis of the spectrum each round of tire rotation.

Preferably, the apparatus further comprising storing means for storing a predetermined threshold value, wherein the evaluating means retrieves the threshold value from the storing means, make a comparison between the peak value and the retrieved threshold value, and determines whether the vehicle is in a safe traveling condition or not, based on the comparison to output a determination result. And preferably, the threshold value is previously determined based on a relationship between an acceleration peak value of a spectrum in a frequency range of 500 Hz-1500 Hz of the tire and a measurement force value of cornering force or lateral force of the tire, the measurement force value being acquired by a tire test machine which measure the cornering force or the lateral force of the tire while the tire is rotating, and the acceleration peak value being obtained from a measurement acceleration data at a fixed position of the tire while the tire is rotating on the tire test machine.

The present invention also provides a method for evaluating a degree of a safety in traveling of a vehicle provided with wheels each having a tire mounted thereon, while the vehicle is traveling on a road surface, the method comprising: an acceleration data acquiring step for acquiring acceleration data in time series at a fixed position of the tire, the acceleration being generated by an external force applied from the road surface to the tire which is rotating, while the vehicle is traveling on the road surface; a spectrum obtaining step for obtaining a spectrum of the acceleration by subjecting the acquired time series acceleration data to frequency analysis; a peak value detecting step for detecting a peak value of the spectrum of the acceleration in a frequency range of 500 Hz-1500 Hz; and a traveling safety evaluating step for evaluating a degree of a safety in traveling of the vehicle according to the detected peak value.

Preferably, the method for evaluating a degree of a safety in traveling of a vehicle according to Claims 9, wherein the spectrum obtaining step comprises: extracting a time region for analysis of the spectrum, out of a measurement time of the time series acceleration data, the time region for the analysis of the spectrum starting after the fixed position passes a portion corresponding to a contact region between the tire and the road surface and ending when the fixed position reaches a position opposite to a center of the contact region with respect to a tire axis, and determining, as the spectrum of the acceleration, spectrum of the time series acceleration data in the time region for the analysis of the spectrum. And preferably, the method for evaluating a degree of a safety in traveling of a vehicle according to Claim 10, wherein the spectrum obtaining step extracts the time region for the analysis of the spectrum, based on the acquired time series acceleration data.

The present invention enables the traveling safety of the vehicle that varies in real time during driving to be accurately evaluated depending on the amount of slipping between the tire and the road surface.

BRIEF DESCRIPTION OF THE DRAWINGS

In the accompanying drawings:

FIGS. 4A to 4F are charts showing vibrations generated on a tire of a vehicle during traveling;

FIGS. 5A to 5F are charts showing vibrations generated on a tire of a vehicle during traveling;

DETAILED DESCRIPTION OF THE INVENTION

An apparatus and method for evaluating traveling safety of a vehicle of the present invention will hereinafter be described in detail on the basis of preferred embodiments shown in the accompanying drawings.

Figure 1:
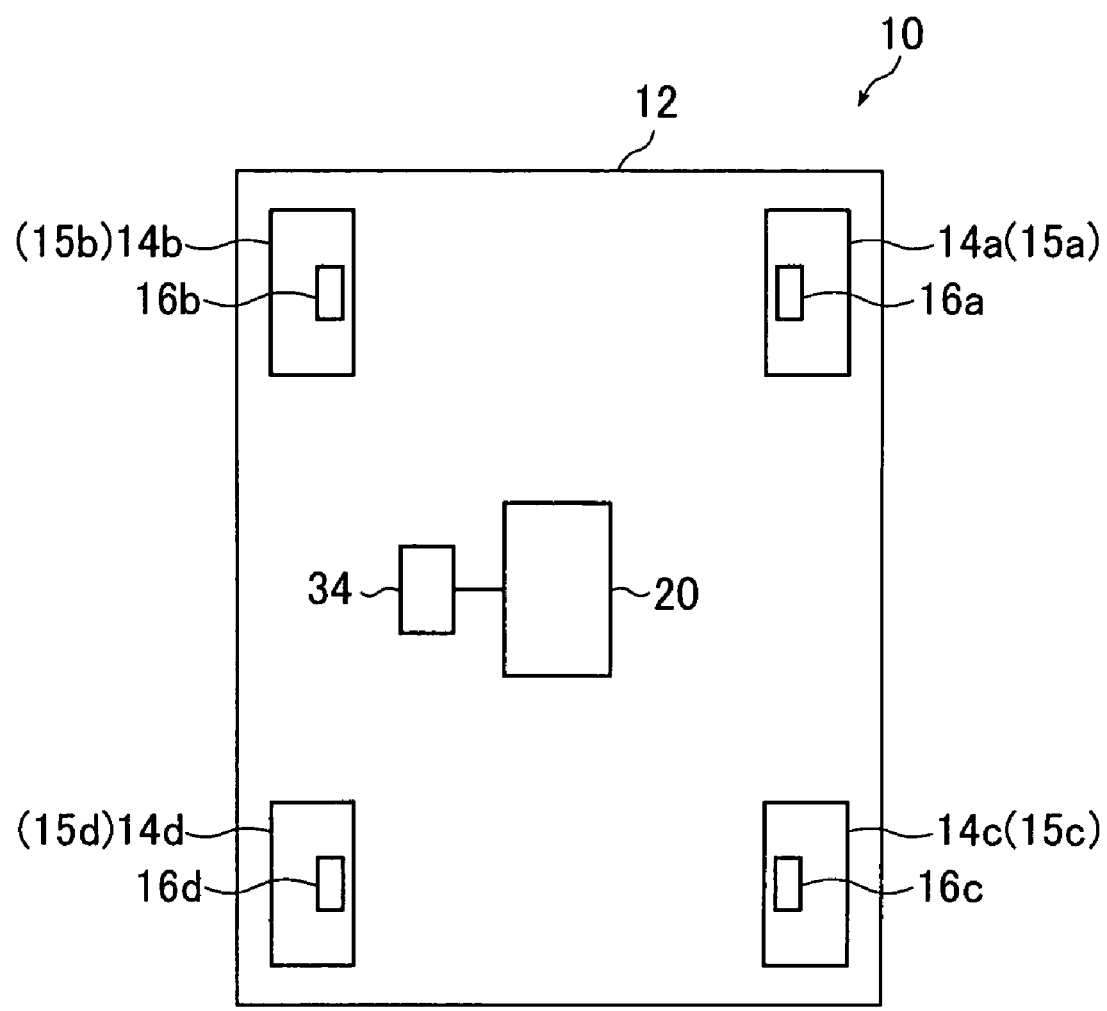
FIG. 1 is a schematic view explaining an example of an apparatus for evaluating traveling safety of a vehicle according to the present invention.

FIG. 1 is a schematic view explaining an evaluating apparatus 10 (apparatus 10) as an example of the apparatus for evaluating traveling safety of a vehicle according to the present invention. The apparatus 10 is provided on a vehicle 12 having four wheels 14a-14d. The apparatus 10 includes sensor units 16a-16d, determining means 20, and informing means 34. Each of the sensor units 16a-16d is provided on each of the four wheels 14a-14d, and acquires information of acceleration at a fixed position of a tire 15 so as to output the information as a radio signal. The acceleration is generated by an external force applied to the tire 15 of each wheel (Refer to FIG. 2) from a road surface while the vehicle 12 is traveling on the road surface. The determining means 20 receives the radio signal transmitted by the sensor units 16a-16d, and acquires the acceleration data in time series of the fixed position of the tire 15. The determining means 20 then subjects the acquired time series acceleration data to frequency analysis to obtain a frequency spectrum of the acceleration data. Based on the obtained frequency spectrum of the acceleration data, it is determined whether the current traveling condition of the vehicle 12 is safe or not. The informing means 34 informs the result of the determination in the determining means 20, and issues an alarm to the driver of the vehicle 12 depending on the result provided by the determining means 20.

Figure 2:
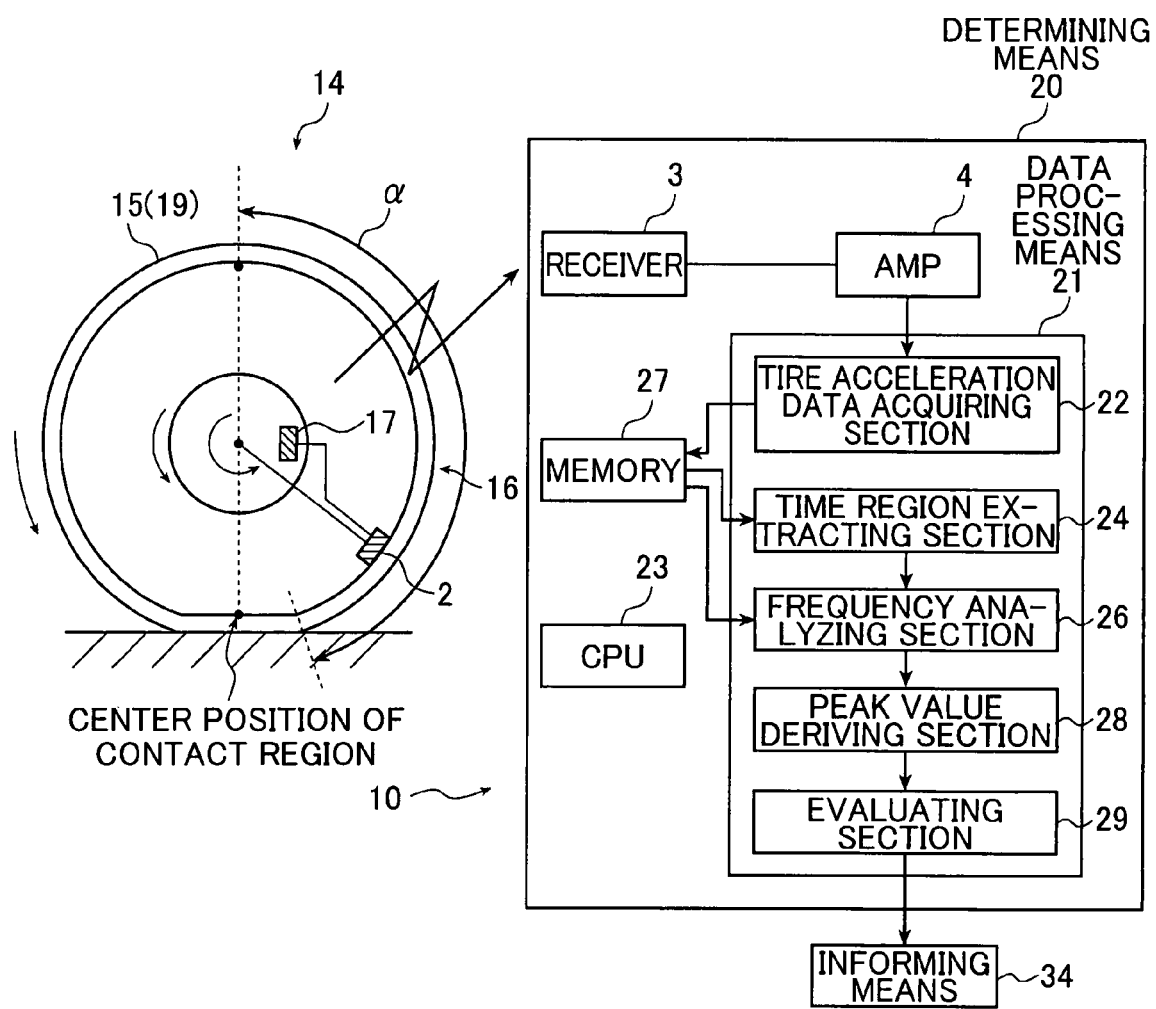
FIG. 2 is a schematic view showing a sensor unit and determining means in the apparatus for evaluating traveling safety of a vehicle shown in FIG. 1.

FIG. 2 is a schematic view showing a sensor unit and determining means in the apparatus for evaluating traveling safety of a vehicle shown in FIG. 1. The determining means 20 shown in FIG. 2 includes a receiver 3, an amplifier (AMP) 4, data processing means 21, a CPU 23, and a memory 27. The determining means 20 is a computer provided with the receiver 3 and the amplifier 4. In the determining means 20, the CPU 23 executes a program stored in the memory 27 to enable each means (each mean which will be explained later) of the data processing means 21 to function. Based on measurement data of acceleration at a tread portion of the tire 15 of the wheel 14 (hereinafter, wheel 14 will be used as any one of the wheels 14a-14d), the determining means 20 determines whether the current traveling condition of the vehicle 12 is safe or not. The measurement data of acceleration, when referred in this description, is the data sensed by an acceleration sensor 2 fixed to an inner surface of a tire cavity region at a tread portion of the tire 15, transmitted from the transmitter 17 of the sensor unit 16 provided on the wheel 14 to the receiver 3, and amplified by the amplifier 4. The transmitter 17 may not be necessary, depending on structure. For example, the acceleration sensor 2 may also have a transmitting function so that the measurement data can be transmitted from the acceleration sensor 2 to the receiver 3. Each transmitter 17 mounted on each of the wheels 14a-14d has an ID with which specific transmitter can be identified. The transmitter 17 transmits the ID along with the measurement data of acceleration measured by the corresponding acceleration sensor.

The acceleration sensor 2 is exemplified by a semiconductor acceleration sensor, for example, disclosed in Japanese Patent Application No. 2003-134727 filed by the present applicant. Specifically, the semiconductor acceleration sensor includes an Si wafer having a diaphragm formed inside the outer peripheral frame portion of the Si wafer, and a pedestal for fixing the outer peripheral frame portion of the Si wafer. A weight is provided at the center part of one surface of the diaphragm, and a plurality of piezoresistors are formed on the diaphragm. When acceleration is applied to this semiconductor acceleration sensor, the diaphragm is deformed to cause the resistance values of the piezoresistors to change. In order to detect such changes as acceleration information, a bridge circuit is formed.

By fixing the acceleration sensor to the tire inner surface, acceleration applied to the tread portion during tire rotation can be measured.

Other sensors that may be used as the acceleration sensor 2, include acceleration pickups that use piezoelectric elements and distortion gage type acceleration pickups that incorporate distortion gages.

The data processing means 21 to which the measurement data of acceleration amplified in the amplifier 4 is supplied, includes a data acquiring section 22, a time region extracting section 24, a frequency analyzing section 26, a peak value deriving section 28, and an evaluating section 29. The data acquiring section 22 is a unit for acquiring, as input data, the measurement data of acceleration at least for a time period during which the tire makes one revolution, which has been amplified in the amplifier 4. Since the data supplied from the amplifier 4 is analog data, the data acquiring section 22 converts the received data into digital data (i.e., acquired acceleration data) by sampling the data at a predetermined sampling frequency. The acquired acceleration data is stored in the memory 27. The data acquiring section 22, based on the ID supplied from each transmitter 17, determines which wheel (which one of the wheels 14a to 14d) the acquired acceleration measurement data is associated with. The measured data is then subjected to subsequent processes in the time region extracting section 24, the frequency analyzing section 26, the peak value deriving section 28, and the evaluating section 29 on an each wheel.

The time region extracting section 24 reads out the acquired acceleration data from the memory 27. The time region extracting section 24 extracts, based on the acquired acceleration data in time series, a time region for analysis. The time region for analysis is a time duration starting after the acceleration sensor 2 passes a portion corresponding to a contact surface (contact region) between the tire 15 and the road surface and ending when the acceleration sensor 2 reaches a position opposite to the center of the contact surface with respect to the tire axis. The time region for analysis is therefore, a time region during which the acceleration sensor 2 is positioned within a portion for analysis indicated by α in FIG. 2. In the time region extracting section 24, for example, time series data (deformation acceleration data) representing an acceleration component due to tire deformation is extracted by subtracting, from the acquired acceleration data in time series, a centrifugal force component due to tire rotation. The extracted deformation acceleration data is used to extract the time region for analysis. In the time region extracting section 24, for example, time series data (deformation acceleration data) representing an acceleration component due to tire deformation may also be extracted by receiving the acceleration data which has been acquired and converted into digital data by the data acquiring section 22 and subjecting the received data to smoothing processing, so that the deformation acceleration data can be used to extract the time region for analysis.

Methods that can be used for subjecting the acquired acceleration data to smoothing processing to produce smoothed acceleration data, include various known methods using, such as a trend model, digital filter, moving average processing, or spline function. The acquired acceleration data contains, as a trend component, change in acceleration due to tire deformation which is caused by deformation of the tire rotating on the road surface. The acceleration component due to tire deformation contains various noise components such as tire vibrations. For example, the acceleration data which has been smoothed by using a known trend model represents the acceleration component in which the centrifugal component is eliminated from the acquired acceleration data. The time region extracting section 24 may use such smoothed acceleration data to extract a time region for analysis.

Figure 3A:
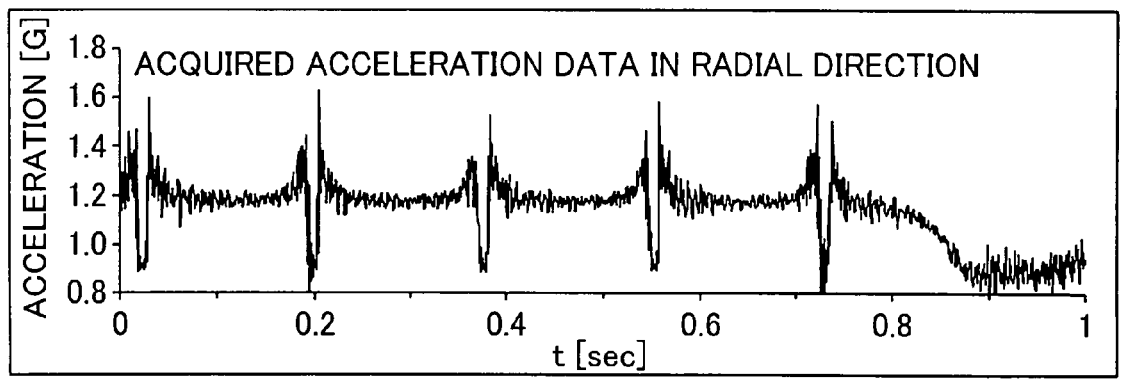
FIGS. 3A to 3C are graphs explaining the processing performed in the time region extracting section shown in FIG. 2.
Figure 3B:
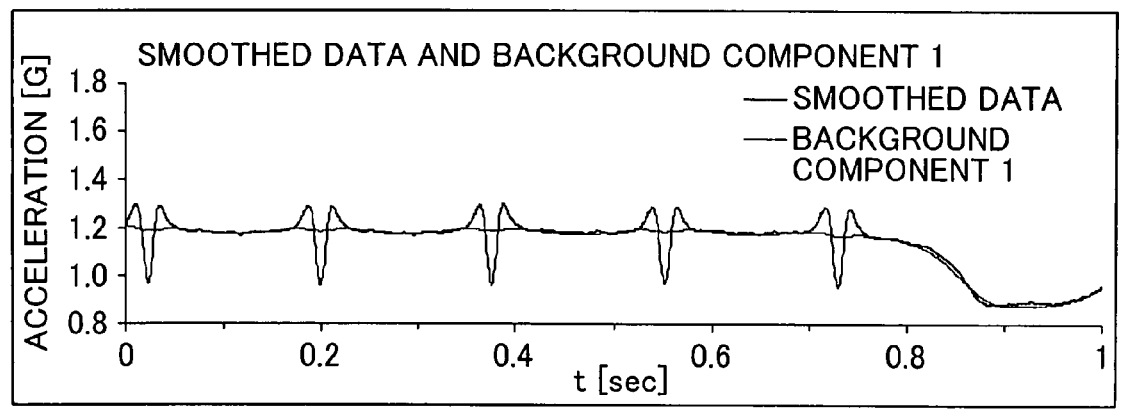
Figure 3C:
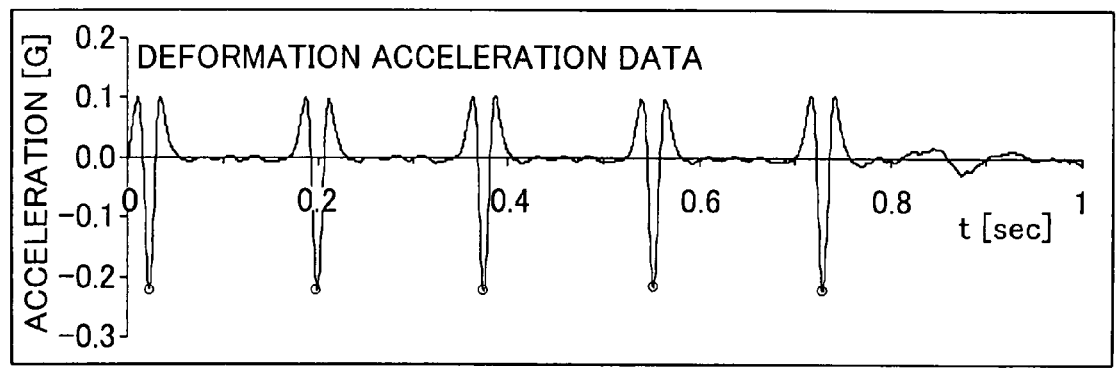

Alternatively, the time region extracting section 24 may extract tire deformation acceleration data in a manner as described below. The FIGS. 3A to 3C are graphs explaining the processing performed in the time region extracting section 24. In this embodiment, the acquired acceleration data (FIG. 3A) is subjected to smoothing processing, and an approximation curve is calculated to the smoothed acceleration data to obtain a background component (FIG. 3B). Then time series data of acceleration due to tire deformation (deformation acceleration data of tire) is extracted by eliminating the obtained background component 1 from the smoothed acceleration data (FIG. 3C). For calculating the approximation curve to the smoothed acceleration data, any of various known approaches may be used, such as approaches using trend model, digital filter, moving average processing, or spline function.

The time region extracting section 24 extracts from the time series waveform of the deformation acceleration data, a timing (contact leading edge timing) when the acceleration sensor 2 provided on the tread portion passes the leading edge portion of the tire contact surface, and a timing (contact trailing edge timing) when the acceleration sensor 2 passes the trailing edge portion of the tire contact surface. For example, two timings at which the time series waveform of deformation acceleration data crosses an acceleration of zero. Of the extracted two timings, the first timing is determined as the contact leading edge timing, and the latter timing is determined as the contact trailing edge timing. The time region extracting section 24 extracts a time region for analysis, with respect to the extracted contact leading edge timing and the contact trailing edge timing. Detailed description of extraction of a time region for analysis will be given later.

In the following paragraphs, description will be given on the relationship between the vibration generated on a tire and the slip angle of the tire contact surface, which has been newly found and utilized in creating the present invention by the inventors of the present invention.

FIGS. 4A to 4F are charts showing vibrations generated on a tire of a vehicle during traveling. The data is obtained with a known indoor tire traveling test machine of flat belt type, by applying a slip angle input to a tire A of a predetermined specification. Similar to the tire 15, an acceleration sensor is mounted at the inner surface of the tread portion of the tire A. As the acceleration sensor to be mounted on the tire A, a sensor capable of measuring not only acceleration in vibrations in the tire radial direction, but also, acceleration in vibrations in the tire circumferential direction, and acceleration in vibrations in the tire width direction was used. FIG. 4F shows time series data of slip angle between the tire A and the contact road surface. As shown in FIG. 4F, a slip angle input which increases in monotone in time series, is applied to the tire A. FIG. 4A shows the acquired acceleration data in the radial direction, obtained by measuring the acceleration data in the radial direction by an acceleration sensor provided on the tire A, and converting it into digital data. FIG. 4E shows the smoothed acceleration data in the radial direction obtained by smoothing the acquired acceleration data in the radial direction with high frequency components being eliminated. FIGS. 4B to 4D show changes in time series of the frequency spectrum (vibration spectrum) of the acquired acceleration data, obtained through frequency analysis performed at every predetermined micro time region (e.g., 0.0016 sec.). FIG. 4B shows time series change in frequency spectrum in the tire circumferential direction. FIG. 4C shows time series data of a frequency spectrum in the tire width direction. FIG. 4D shows time series data of a frequency spectrum in the tire radial direction. In FIGS. 4A to 4F, the horizontal axis represents the time axis. The same coordinate in each time axis represents the same time. From the experiment using the tire A, it has been recognized by an operator in a position in the vicinity of the tire A that a squeal sound is generated from the tire A at a point where the slip angle input to be applied to the tire A increases to a certain level (specifically to a slip angle of 3 degrees).

In general, on a tire which is rotating on a road surface, deformation acceleration in the tire radial direction is generated, which varies in time series, as shown in FIG. 4E. That is, as apparent from FIG. 2, deformation in the tire radial direction increases at the moment when the acceleration sensor reaches the leading edge of the contact surface. Then the deformation decreases while the acceleration sensor passes across the contact surface portion (in particular, decreases to almost 0 at the center position of the contact surface) since the acceleration sensor moves in parallel with the road surface. Then the deformation again increases at the moment when the acceleration sensor passes the trailing edge of the contact surface. Accordingly, based on the smoothed acceleration data in the tire radial direction with high frequency components (noise components) being eliminated, as shown in FIG. 4E, the time region (contact time region $C_1$-$C_8$), as shown in FIG. 4E, where the acceleration sensor just enters the contact region between the tire and the road surface can be determined. Smoothing processing and determining processing of contact time regions will be described later in detail.

The acquired acceleration data in the tire radial direction, shown in FIG. 4A is the smoothed acceleration data (time series acceleration generated in accordance with tire deformation) shown in FIG. 4E to which other noise components (mainly tire vibration component) are added. As apparent from the comparison between FIG. 4F and FIG. 4A, when the slip angle of the tire increases, the noise component in the acquired acceleration data increases. The inventors of the present invention have noted to those noise components in the tire width direction, in the circumferential direction, and in the radial direction that increase with the increase in the slip angle of the tire and have derived changes with time in each frequency spectrum of the acquired acceleration data generated on the tire, as respectively shown in FIGS. 4B to 4D, and recognized the manner in which changes occur. In each graph in FIGS. 4B to 4D, the vertical axis shows frequencies, and levels of spectrum value are represented by degree of thickness in shading (i.e., dot density).

The inventors of the present invention have compared and studied the graphs shown in FIGS. 4B to 4D, and found the fact that the noise components of the acquired acceleration data appear in the tire radial direction most strongly among other directions. The inventors have studied the frequency spectrum of the acquired acceleration data in the tire radial direction shown in FIG. 4D with respect to the contact time region $C_1$-$C_8$ determined from the graph shown in FIG. 4E, and then investigated the relation between the position on the rotating tire to which the acceleration sensor is mounted and the frequency spectrum in the radial direction. From the investigation, the inventors have found that, as shown in FIG. 4D, the frequency spectrum in the radial direction maintains high spectrum levels not only while the acceleration sensor positions within the contact surface (contact time region $C_1$-$C_8$), but also over a predetermined time region (time region for analysis $E_1$-$E_8$) which starts just after the acceleration sensor passes the trailing edge of the contact surface and ends when the acceleration sensor reaches a position opposite to the center of the contact surface with respect to the tire axis. In other words, it has been found that under a condition in which a squeal sound is generated from the tire due to increase in slip angle, particularly large tire vibrations are generated at a portion ranging from the leading edge of the tire contact surface to the trailing edge of the contact surface (portion for analysis). Also, it has been found that such vibrations are dominated by the vibrations in the tire radial direction.

As apparent from the comparison of FIGS. 4B-4D, the frequency spectrum of the acquired acceleration data in the tire radial direction is the most distinguishable among others. In addition, since peaks in the frequency spectrum concentrate in a frequency range of 500 Hz-1500 Hz, across over the contact time region and the time region for analysis, peaks of the frequency spectrum fall within this frequency range of 500 Hz-1500 Hz. As described above, the frequency range of 500 Hz-1500 Hz is the frequency range corresponding to the squeal sound generated on a tire. Moreover, comparing the distribution of spectrum values in the contact time region $C_1$-$C_8$ and the distribution of spectrum values in the time region for analysis $E_1$-$E_8$ shows that the frequencies of the spectrum peaks in the time region for analysis $E_1$-$E_8$ are lower (low frequency) than the frequencies of the spectrum peaks in the contact time region $C_1$-$C_8$.

FIGS. 5A to 5F are charts showing vibrations generated on a tire of a vehicle during traveling, similar to FIGS. 5A to 5F. The data shown in FIGS. 5A to 5F is also obtained with a known indoor tie traveling test machine of flat belt type, by applying a slip angle input to a tire B of different specification from the tire A described above. Similar to the tire 15, an acceleration sensor is mounted at the inner surface of the tread portion. In the experiment using the tire B, the slip angle input was increased monotonously until the slip angle reaches 10 degrees, same as in the experiment using the tire A. However, the operator positioned in the vicinity of the tire B did not confirm the occurrence of a squeal sound from the tire B. In this case, no characteristic noise components appeared in the data shown in FIGS. 5B to 5D.

Figure 6A:
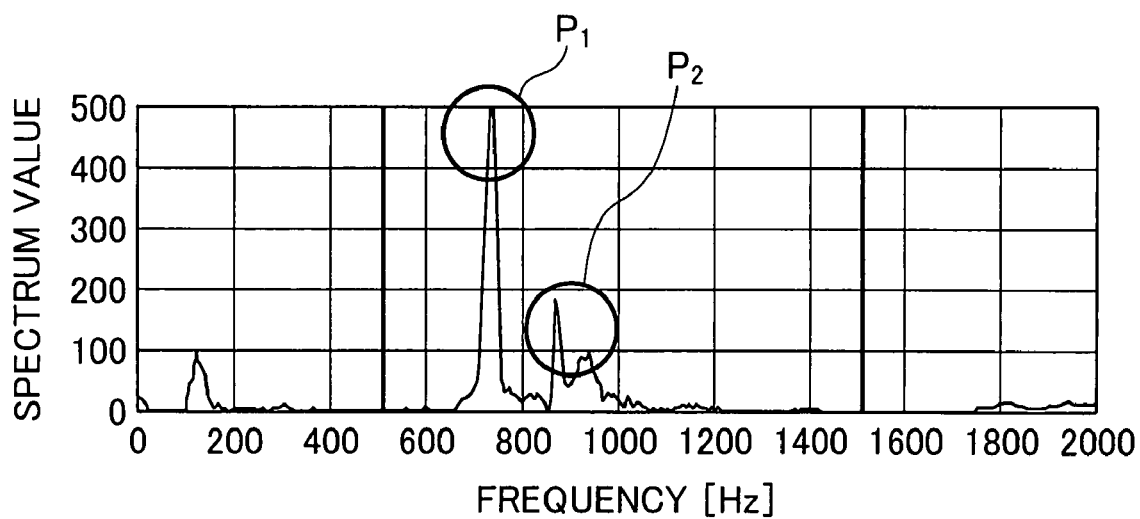
FIGS. 6A and 6B show frequency spectra of acceleration in the radial direction generated on two different tires to which a slip angle input is applied.

FIG. 6A shows a frequency spectrum in the radial direction, over a time region during which the tire makes one revolution, obtained by applying an input of slip angle of 6 degrees to the tire A. As can be determined from each graph in FIGS. 4A to 4F, in this condition (i.e., slip angle of 6 degrees) a squeal sound is generated from the tire A. As shown in FIG. 6A, under a condition in which a squeal sound is generated, the frequency spectrum in the radial direction has relatively high spectrum values within the frequency range of 500 Hz-1500 Hz, and also has spectrum peaks within this frequency range. In the frequency spectrum in the radial direction shown in FIG. 6A, roughly two types of characteristic spectrum peaks are recognized. As apparent from FIG. 4D, out of the two types of characteristic spectrum peaks, shown in FIG. 6A, the relatively low frequency peak (indicated by $P_1$ in FIG. 6A) is caused by tire vibrations mainly in the portion for analysis, while the relatively high frequency peak (indicated by $P_2$ in FIG. 6A) is caused by tire vibrations generated mainly when the acceleration sensor passes across the tire contact surface.

Figure 6B:
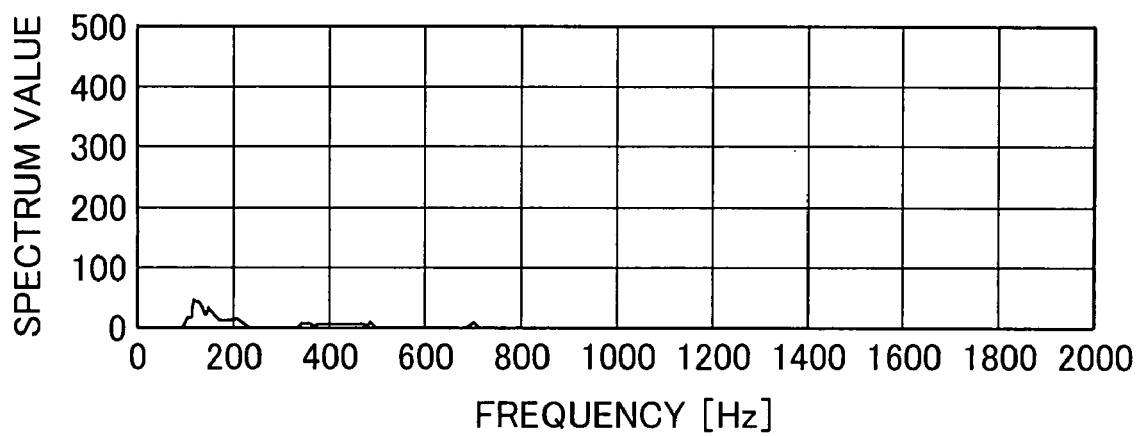

Comparing the two characteristic spectrum peaks shown in FIG. 6A shows that the tire vibrations over the time region during which the tire makes one revolution are dominated by the vibration component in the portion for analysis (i.e., $P_1$ is larger than $P_2$ in FIG. 6A). FIG. 6B shows a frequency spectrum in the radial direction, over a time region during which the tire makes one revolution, obtained by applying an input of slip angle of 10 degrees to the tire B different in specification from the tire A. As can be determined from each graph in FIGS. 4A to 4F, even in this condition (i.e., slip angle of 10 degrees) no squeal sound is generated from the tire 15. As shown in FIG. 6B, under a condition in which no squeal sound is generated, there is no significant spectrum peak within the frequency range of 500 Hz-1500 Hz.

The present invention has been made utilizing the following findings obtained through the above described experiments conducted by the inventors of the present invention: (1) when a squeal sound is generated due to increase in slip angle, the noise component (mainly component of the tire vibration) of the acquired acceleration data in the tire radial direction is the most distinguishable, among those in the tire width direction, the circumferential direction, and the radial directions; (2) The frequency spectrum of the acquired acceleration data in the tire radial direction maintains high spectrum values not only while the acceleration sensor positions within the contact surface (contact time region), but also during a predetermined time region which starts just after the acceleration sensor passes the trailing edge of the contact surface and ends when the acceleration sensor reaches a position opposite to the center of the contact surface with respect to the tire axis. Rather, the spectrum values are dominantly high over a predetermined time region (time region for analysis) which starts just after the acceleration sensor passes the trailing edge of the contact surface and ends when the acceleration sensor reaches a position opposite to the center of the contact surface with respect to the tire axis; and (3) Such frequency spectrum in the radial direction has spectrum peaks in the frequency range of 500 Hz-1500 Hz which is corresponding to the squeal sound generated on the tire.

It should be noted that the reason why a time region for analysis is extracted in the time region extracting section 24 is because, as described above, in the noise components of the acquired acceleration data in the tire radial direction over a time region during which the tire makes one revolution, the noise component of the acquired acceleration data in the tire radial direction in the time region for analysis is dominantly large. The information of time region for analysis which is extracted in the time region extracting section 24 is sent to the frequency analyzing section 26.

The frequency analyzing section 26 receives the information of time region for analysis from the time region extracting section 24, and reads out the acquired acceleration data from the memory 27. The frequency analyzing section 26 performs frequency analysis at every time region for analysis of each tire revolution, which has been extracted in the time region extracting section 24 so as to obtain a frequency spectrum of the acquired acceleration data in the tire radial direction as shown in FIGS. 6A and 6B. The frequency analyzing section 26 outputs the vibration spectrum thus obtained in the radial direction to the peak value deriving section 28. The peak value deriving section 28 derives, from the vibration spectrum in the radial direction outputted by the frequency analyzing section 26, peak values of the frequency spectrum (spectrum peak values) and then derives the maximum value (maximum spectrum peak value) of the obtained peak values.

Figure 7A:
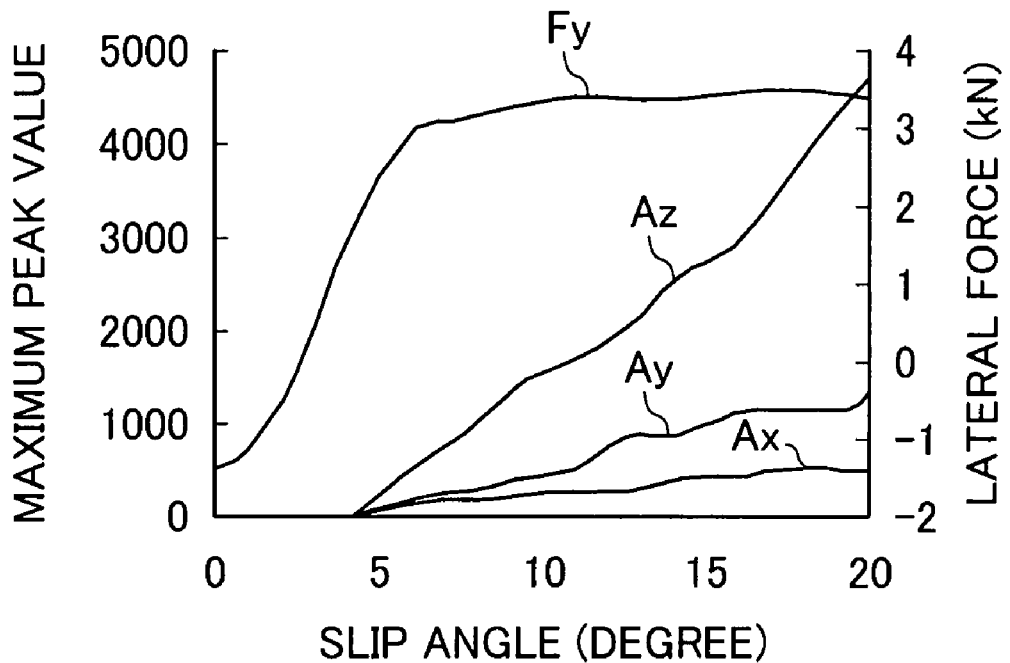
FIGS. 7A and 7B are scatter diagrams of different tires, representing the relationship of the lateral force generated in the contact region of the tire, and of the maximum value in the frequency spectrum of acceleration in the tire radial direction, each with respect to the degree of slip angle.
Figure 7B:
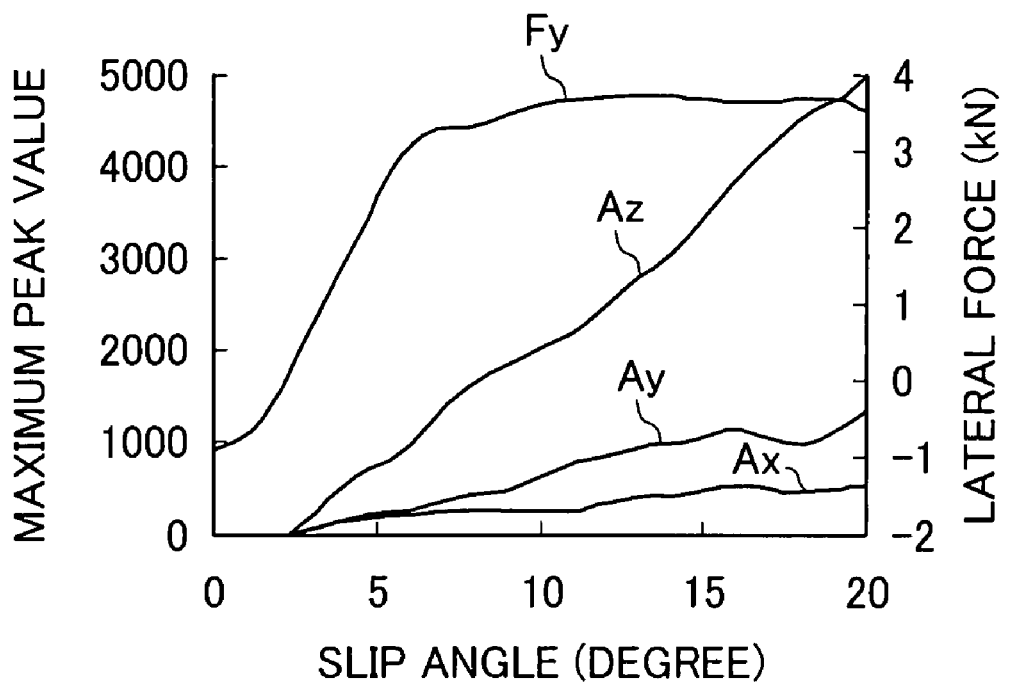

FIGS. 7A and 7B are graphs for tires of each predetermined specification, derived using a known indoor tire test machine for showing the relationship between the degree of slip angle and the lateral force generated in the contact region of the tire, and the relationship between the degree of slip angle and the maximum spectrum peak value of the acquired acceleration data in the tire radial direction. Specifically, FIG. 7A is a graph showing the relationship between the maximum spectrum peak value of the acquired acceleration data and the slip angle over a time region during which the tire makes one revolution. FIG. 7B is a graph showing the relationship between the maximum spectrum peak value of the acquired acceleration data and the slip angle, in which the acquired acceleration data only for the time region for analysis is subjected to frequency analysis. In FIGS. 7A and 7B, "Fy" represents the lateral force generated on the contact region of the tire, "Ax" represents the maximum spectrum peak value in the tire circumferential direction, "Ay" represents the maximum spectrum peak value in the tire width direction, and "Az" represents the maximum spectrum peak value in the tire radial direction. The maximum spectrum peak value in each direction is obtained in such a manner that the acquired acceleration data is subjected to frequency analysis over the time region during which the tire makes one revolution to obtain a spectrum (frequency spectrum), then peak values of the frequency spectrum are obtained from the vibration spectrum, so that the maximum value is extracted from the obtained peak values. As shown in FIGS. 7A and 7B, with increase in slip angle between the tire and the road surface, the level of the maximum spectrum peak value increases in monotone.

In either case of FIG. 7A or FIG. 7B, the relationship between the slip angle between the tire and the road surface, and the maximum spectrum peak value in each direction shows a good linear relationship. Moreover, in either case of FIG. 7A or FIG. 7B, the relationship between the slip angle between the tire and the road surface and the maximum spectrum peak value in the tire radial direction shows a particularly good linear relationship. The reason why the slip angle between the tire and the road surface and the maximum spectrum peak value shows a good linear relationship in the graph shown in FIG. 7A, as well as in the graph shown in FIG. 7B is because the noise component (mainly vibration noise component) is dominantly large in the time region for analysis out of the time region during which the tire makes one revolution. In addition, comparison of FIG. 7A and FIG. 7B shows that the value of "Az" (maximum spectrum peak value in the tire radial direction), in particular, is higher in FIG. 7B than in FIG. 7A, across the whole range of input slip angles. Also, as described above, the frequencies corresponding to the maximum spectrum peak value fall within a frequency range of 500 Hz-1500 Hz which is corresponding to the frequency range of the squeal sound generated on the tire. It is therefore the maximum spectrum peak value obtained by subjecting the acquired acceleration data in the radial direction only over the time region for analysis to frequency analysis is more sensitive to the squeal sound (i.e., sensitive to vibrations corresponding to squeal sound) than the maximum spectrum peak value obtained by subjecting the acquired acceleration data in the radial direction over the time region (including the contact region) during which the time makes one revolution to frequency analysis. In this embodiment, the maximum spectrum peak value thus obtained over the time region for analysis is used to derive an evaluation value representing the degree of slip angle between the tire and the road surface.

Accordingly, the level of peak value of the frequency spectrum of the acquired acceleration data in the tire radial direction accurately represents the degree of slip angle between the tire and the road surface. In this embodiment, for example, such relationship between the slip angle and the maximum spectrum peak value is previously derived for the tire 15 mounted to the vehicle 12, and the maximum spectrum peak value corresponding to the upper limit value of slip angle allowable for the vehicle to be capable of safe traveling is set as the threshold value for determining the current traveling safety of a vehicle. The threshold value thus set is previously stored in the memory 27.

The evaluating section 29 compares the maximum spectrum peak value (evaluation value) derived in the peak value deriving section 28 each time when the tire makes one revolution with the threshold value previously stored in the memory 27, to determine whether the evaluation value is higher than the threshold value or not. The determination result is outputted on a display. It should be noted that the threshold value, as described above, represents the upper limit value of slip angle allowable for the vehicle to be capable of safe traveling. If the evaluation value (the maximum spectrum peak value in the tire radial direction, appropriately corresponding to the degree of slip angle of the tire 15) is lower than the threshold value previously set, the degree of slip angle between the tire 15 and the road surface is within a range in which the vehicle 12 provided with the tire 15 is capable of safe traveling. If the evaluation value is higher than the threshold value previously set, the degree of slip angle between the tire 15 and the road surface exceeds the upper limit allowable for the vehicle 12 provided with the tire 15 to be capable of safe traveling and therefore the vehicle 12 is not in a safe traveling condition.

The informing means 34 provided with, for example, a display and speaker which are not shown, receives information of determination result whether the vehicle is in a safe traveling condition or not, sent from the evaluating section 29, and, if necessary, issues an alarm to the driver of the vehicle 12. When issuing an alarm to the driver of the vehicle 12, the informing means 34 informs the driver which specific wheel has a slip angle extremely increased. This is accomplished, for example, by generating an alarm sound from a speaker, or displaying an alerting image on a display.

Figure 8:
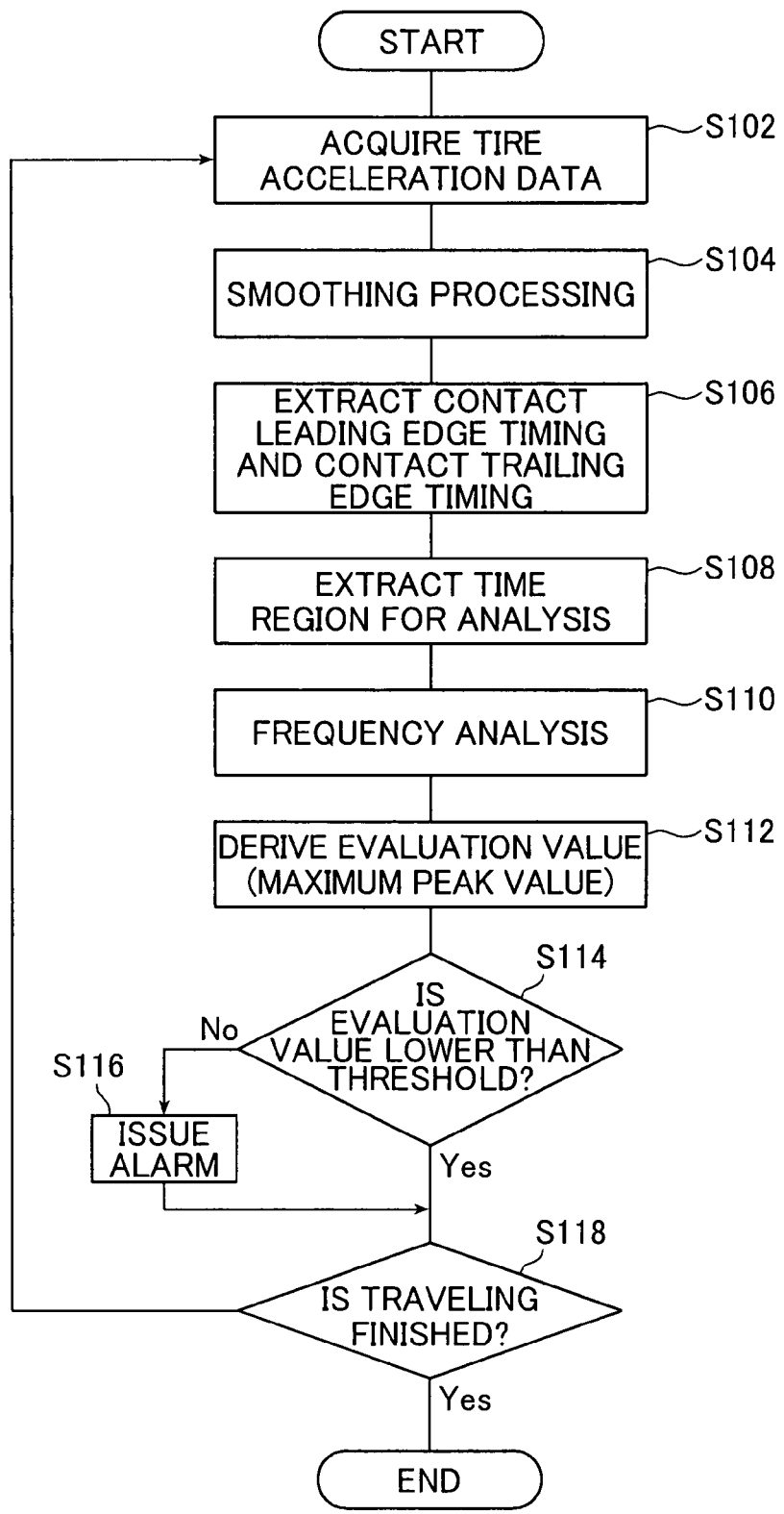
FIG. 8 is a flowchart showing an example of the method for evaluating traveling safety of a vehicle according to the present invention.

FIG. 8 is an example of a flowchart of a method for evaluating traveling safety of a vehicle implemented in the apparatus 10. In the following paragraphs, one example of a method for evaluating traveling safety will be described for the vehicle 12 in a traveling condition. The measurement data of acceleration of each wheel, which has been amplified by the amplifier 4 is supplied to the data acquiring section 22, and then the supplied measurement data is sampled at a predetermined sampling frequency so that digital measurement data (acquired acceleration data) is obtained (Step S102). In this case, the data acquiring section 22 identifies, based on each ID transmitted by each transmitter 15, as described above, which specific wheel (out of wheels 14a-14b) has the tire generating the measurement data. In the subsequent processing, the measurement data of the tire of each wheel is processed.

The acquired measurement data (acquired acceleration data) is stored in the memory 27. The time region extracting section 24 reads out the acquired acceleration data from the memory 27. Then smoothing processing is performed using a low-pass filer in the time region extracting section 24 (Step S104). As the measurement data supplied to the time region extracting section 24 contains many noise components as shown in FIG. 4A and FIG. 5A, the data is subjected to smoothing processing to provide smoothed data as shown in FIG. 4E and FIG. 5E. The filters that may be used include, for example, digital filters that assume a certain frequency as a cut-off frequency. The cut-off frequency changes depending on rotation speeds or noise components. For example, if the rotation speed is 60 (km/h), the cut-off frequency is between 500 Hz and 2000 Hz. Alternatively, instead of using digital filters, moving average process, trend model process, and other suitable processes may be used as the smoothing processing.

Figure 9:
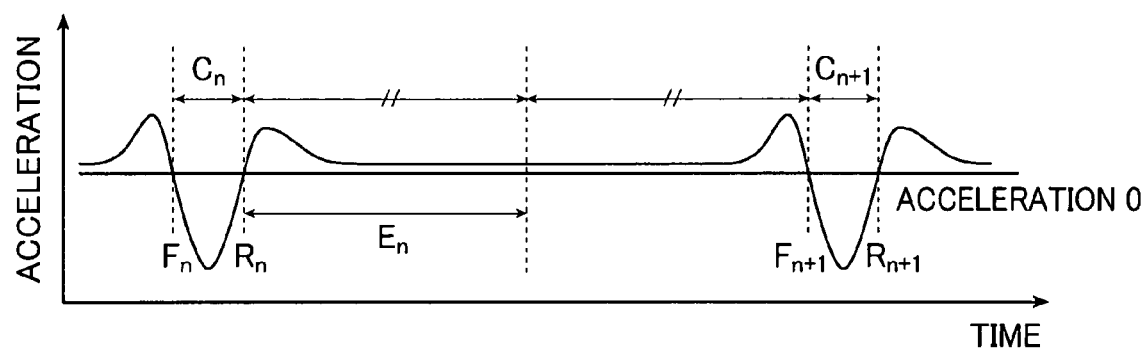
FIG. 9 is a schematic view showing time series wave forms of acceleration in the tire radial direction over a time period during which the tire makes two revolutions.

The time region extracting section 24 then extracts from the time series waveform of the smoothed acceleration data, a timing (contact leading edge timing) when the acceleration sensor 2 provided at a tread portion passes the leading edge portion of the tire contact surface, and a timing (contact trailing edge timing) when the acceleration sensor 2 passes the trailing edge portion of the tire contact surface. Specifically, two timings at which the time series waveform of the deformation acceleration data which has been obtained by extracting the centrifugal component from the acceleration data in the radial direction crosses an acceleration of zero. Of the extracted two timings, the first timing is determined as the contact leading edge timing, and the latter timing is determined as the contact trailing edge timing. FIG. 9 is a schematic view showing the time series waveform of the deformation acceleration data for a time region during which the tire makes two revolutions. In the time region extracting section 24, as shown in FIG. 9, the contact leading edge timing ($F_n$ and $F_{n+1}$), and the contact trailing edge timing ($R_n$ and $R_{n+1}$) are extracted each time the tire makes one revolution.

The time region extracting section 24, then extracts and sets the time region for analysis each time the tire make one revolution. In this way, the time region for analysis is the time region corresponding to the time during which the acceleration sensor 2 passes across the portion a for analysis shown in FIG. 2. More specifically, as described above, the time region for analysis means the time region starting after the acceleration sensor 2 passes the portion corresponding to the contact region between the tire and the road surface and ending when the acceleration sensor 2 reaches a position opposite to the center position of the contact region with respect to the tire axis. In the case where the tire rotates at a constant speed, assuming that the time region from the timing (for example, contact trailing edge timing $R_n$ shown in FIG. 9) at which the acceleration sensor 2 passes the trailing edge portion of the tire contact surface to the timing (for example, contact leading edge timing $F_{n+1}$) at which the acceleration sensor 2 passes the leading edge portion of the tire contact surface next time is equally divided into two halves of time region, the time region for analysis approximately corresponds to the first half portion (for example, $E_n$ in FIG. 9). In the time region extracting section 24, based on the extracted contact leading edge timing and the contact trailing edge timing, the time region for analysis (time region for analysis $E_1$-$E_8$) is extracted each time the tire makes one revolution, as shown in FIGS. 4E and 5E.

Then, the frequency analyzing section 26 receives the information of time region for analysis from the time region extracting section 24, and reads out the acquired acceleration data from the memory 27. In the frequency analyzing section 26, the time series acquired acceleration data is subjected to frequency analysis for each time region for analysis of each revolution of the tire, extracted in the time region extracting section 24, to obtain a frequency spectrum (vibration spectrum in the radial direction) of the acquired acceleration data in the tire radial direction to output (Step S110).

Then, the peak value deriving section 28 derives, from the frequency spectrum in the radial direction outputted by the frequency analyzing section 26, the maximum value (maximum spectrum peak value) of the peak values in the frequency range of 500 Hz-1500 Hz (Step S112). Then, the evaluating section 29 evaluates the current traveling safety of the vehicle 12, based on the maximum spectrum peak value derived at every revolution of the tire (time region for analysis) (Step S114). In the evaluating section 29, the evaluation value for each revolution of the tire derived in Step 112 and the threshold value previously stored in the memory 27 are compared to determine whether the evaluation value is higher than the threshold value or not. The determination result is displayed on a not-shown display of the informing means 34.

If the evaluation value is lower than the threshold value previously set (determination result is YES in Step S114), the degree of slip angle between the tire 15 and the road surface is within a range in which the vehicle 12 provided with the tire 15 is capable of safe traveling. In this case (determination result is YES in Step S114), the determination result is displayed on a display using a normal display mode. On the other hand, if the evaluation value is higher than the threshold value previously set (determination result is NO in Step S114), the slip angle between the tire 15 and the road surface is larger than the upper limit value allowable for the vehicle 12 provided with the tire 14 to be capable of safe traveling, and therefore the vehicle 12 is not in a safe traveling condition. In this case (determination result in Step S114 is NO), an alarm is generated by the informing means 34 (Step S116). For example, by generating an alarm sound from a speaker, or by displaying an image informing the alarm on a display, an alarm is issued to the driver of the vehicle 12, to inform the driver which specific wheel has the slip angle extremely increased. With such alarm, the driver of the vehicle 12 knows whether the current vehicle is in a safe traveling condition or not. The series of processing from Step S102 to Step S116 is repeated until the vehicle 12 finishes traveling.

The evaluation value is not limited to the maximum value (maximum spectrum peak value) of the peak values of the frequency spectrum in the time region for analysis. And that, there is no special limitation on the time region to be subjected to frequency analysis. For example, the evaluation value may be the peak value of the frequency spectrum in a time region during which the tire makes one revolution. However, since the noise components in vibrations of a rotating tire becomes dominantly large in the region for analysis, in order to evaluate the traveling safety of a vehicle more accurately, it is preferable to use, as the evaluation value, the peak values in the vibration spectrum in the time region for analysis. Further, as the evaluation value, it is not limited to use the maximum spectrum peak value in the tire radial directions. For example, spectrum values in other directions such as tire circumferential direction, or tire width direction may be used. However, acceleration in the tire radial direction is particularly large, compared to either one of deformation acceleration in the tire circumferential direction and acceleration in the tire width direction. It is therefore preferable to use the maximum value of the spectrum values of acceleration in the tire radial direction, as the evaluation value for evaluating traveling safety of a vehicle with high accuracy.

The present invention is not limited to calculating the evaluation value each time when the tire makes one revolution to evaluate traveling safety each time when the tire makes one revolution. For example, the evaluation value corresponding to one revolution of the tire may be calculated at a certain time interval to evaluate the traveling safety at such time interval. Alternatively, a series of evaluation values each corresponding to one revolution of the tire may be calculated with a certain time interval, and an average value is obtained from the plurality of evaluation values acquired at the certain time interval, and the obtained average value is used to determine traveling safety of a vehicle at a certain time interval. There is no particular limitation imposed on evaluation approach or evaluation criteria in the present invention.

While the apparatus and method for evaluating traveling safety of a vehicle according to the present invention have been described thus far in detail, it should be understood that the present invention is not limited to the above embodiments, and rather covers all modifications equivalents, and alternatives without departing from the spirit of the invention.

What is claimed is:

1. An apparatus for evaluating a degree of a safety in traveling of a vehicle provided with wheels each having a tire mounted thereon, while the vehicle is traveling on a road surface, the apparatus comprising:
   acceleration data acquiring means disposed in the tire for acquiring acceleration data in time series at a fixed position in the tire, the acceleration being generated by an external force applied from the road surface to the tire which is rotating, while the vehicle is traveling on the road surface;
   spectrum obtaining means for obtaining a spectrum of the acceleration by subjecting the acquired time series acceleration data to frequency analysis;
   peak value detecting means for detecting a peak value of the spectrum of the acceleration in a frequency range of 500 Hz-1500 Hz; and
   traveling safety evaluating means for evaluating a degree of a safety in traveling of the vehicle according to the detected peak value.

2. The apparatus for evaluating a degree of a safety in traveling of a vehicle according to claim 1, wherein the acceleration data acquired in the acceleration data acquiring means includes acceleration data in a radial direction of the tire.

3. The apparatus for evaluating a degree of a safety in traveling of a vehicle according to claim 1, wherein the acceleration data at the fixed position in the tire is measured by an acceleration sensor mounted on the fixed position in the tire, the acceleration being generated by the external force applied from the road surface to the tire which is rotating, while the vehicle is traveling on the road surface, the acceleration sensor measuring and outputting acceleration at the fixed position.

4. The apparatus for evaluating a degree of a safety in traveling of a vehicle according to claim 1, wherein the spectrum obtaining means comprises:
   extracting a time region for analysis of the spectrum, out of a measurement time of the time series acceleration data, the time region for the analysis of the spectrum starting after the fixed position passes a portion corresponding to a contact region between the tire and the road surface and ending when the fixed position reaches a position opposite to a center of the contact region with respect to a tire axis, and
   determining, as the spectrum of the acceleration, a spectrum of the time series acceleration data in the time region for the analysis of the spectrum.

5. The apparatus for evaluating a degree of a safety in traveling of a vehicle according to claim 4, wherein the spectrum obtaining means extracts the time region for the analysis of the spectrum, based on the acquired time series acceleration data.

6. The apparatus for evaluating a degree of a safety in traveling of a vehicle according to claim 4, wherein the evaluating means evaluates a degree of a safety in traveling of the vehicle according to a maximum value of the peak value of the spectrum of the time series acceleration data within the time region for the analysis of the spectrum each round of tire rotation.

7. The apparatus for evaluating a degree of a safety in traveling of a vehicle according to claim 1, further comprising storing means for storing a predetermined threshold value, wherein the evaluating means retrieves the threshold value from the storing means, make a comparison between the peak value and the retrieved threshold value, and determines whether the vehicle is in a safe traveling condition or not, based on the comparison to output a determination result.

8. The apparatus for evaluating a degree of a safety in traveling of a vehicle according to claim 7, wherein the threshold value is previously determined based on a relationship between an acceleration peak value of a spectrum in a frequency range of 500 Hz-1500 Hz of the tire and a measurement force value of cornering force or lateral force of the tire, the measurement force value being acquired by a tire test machine which measure the cornering force or the lateral force of the tire while the tire is rotating, and the acceleration peak value being obtained from a measurement acceleration data at the fixed position in the tire while the tire is rotating on the tire test machine.

9. A method for evaluating a degree of a safety in traveling of a vehicle provided with wheels each having a tire mounted thereon, while the vehicle is traveling on a road surface, the method comprising:
   acquiring acceleration data in time series at a fixed position in the tire, the acceleration being generated by an external force applied from the road surface to the tire which is rotating, while the vehicle is traveling on the road surface;
   obtaining a spectrum of the acceleration by subjecting the acquired time series acceleration data to frequency analysis;
   detecting a peak value of the spectrum of the acceleration in a frequency range of 500 Hz-1500 Hz; and
   evaluating a degree of a safety in traveling of the vehicle according to the detected peak value.

10. The method for evaluating a degree of a safety in traveling of a vehicle according to claim 9, wherein obtaining the spectrum comprises:
    extracting a time region for analysis of the spectrum, out of a measurement time of the time series acceleration data, the time region for the analysis of the spectrum starting after the fixed position passes a portion corresponding to a contact region between the tire and the road surface and ending when the fixed position reaches a position opposite to a center of the contact region with respect to a tire axis, and
    determining, as the spectrum of the acceleration, a spectrum of the time series acceleration data in the time region for the analysis of the spectrum.

11. The method for evaluating a degree of a safety in traveling of a vehicle according to claim 10, wherein extracting the time region for the analysis of the spectrum is based on the acquired time series acceleration data.

12. An apparatus for evaluating a degree of a safety in traveling of a vehicle provided with wheels each having a tire mounted thereon, while the vehicle is traveling on a road surface, the apparatus comprising:
    a sensor unit disposed in the tire configured to acquire acceleration data in time series at a fixed position in the tire, the acceleration being generated by an external force applied from the road surface to the tire which is rotating, while the vehicle is traveling on the road surface; and
    a computing device, provided with a receiver and amplifier, configured to:
       obtain a spectrum of the acceleration by subjecting the acquired time series acceleration data to frequency analysis;
       detect a peak value of the spectrum of the acceleration in a frequency range of 500 Hz-1500 Hz; and
       evaluate a degree of a safety in traveling of the vehicle according to the detected peak value.

13. The apparatus for evaluating a degree of a safety in traveling of a vehicle according to claim 12, wherein the acceleration data comprises acceleration data in a radial direction of the tire.

14. The apparatus for evaluating a degree of a safety in traveling of a vehicle according to claim 12, wherein the sensor unit is mounted on the fixed position in the tire, the acceleration being generated by the external force applied from the road surface to the tire which is rotating, while the vehicle is traveling on the road surface, the sensor unit measuring and outputting acceleration at the fixed position.

15. The apparatus for evaluating a degree of a safety in traveling of a vehicle according to claim 12, wherein the computing device is further configured to:
- extract a time region for analysis of the spectrum, out of a measurement time of the time series acceleration data, the time region for the analysis of the spectrum starting after the fixed position passes a portion corresponding to a contact region between the tire and the road surface and ending when the fixed position reaches a position opposite to a center of the contact region with respect to a tire axis, and
- determine, as the spectrum of the acceleration, a spectrum of the time series acceleration data in the time region for the analysis of the spectrum.

16. The apparatus for evaluating a degree of a safety in traveling of a vehicle according to claim 15, wherein the computing device extracts the time region for the analysis of the spectrum, based on the acquired time series acceleration data.

17. The apparatus for evaluating a degree of a safety in traveling of a vehicle according to claim 15, wherein the computing device evaluates a degree of a safety in traveling of the vehicle according to a maximum value of the peak value of the spectrum of the time series acceleration data within the time region for the analysis of the spectrum each round of tire rotation.

18. The apparatus for evaluating a degree of a safety in traveling of a vehicle according to claim 12, further comprising a memory for storing a predetermined threshold value, wherein the computing device retrieves the threshold value from the memory, makes a comparison between the peak value and the retrieved threshold value, and determines whether the vehicle is in a safe traveling condition or not, based on the comparison to output a determination result.

19. The apparatus for evaluating a degree of a safety in traveling of a vehicle according to claim 18, wherein the threshold value is previously determined based on a relationship between an acceleration peak value of a spectrum in a frequency range of 500 Hz-1500 Hz of the tire and a measurement force value of cornering force or lateral force of the tire, the measurement force value being acquired by a tire test machine which measure the cornering force or the lateral force of the tire while the tire is rotating, and the acceleration peak value being obtained from a measurement acceleration data at a fixed position in the tire while the tire is rotating on the tire test machine.

* * * * *